(12) United States Patent
Correia e Costa et al.

(10) Patent No.: US 10,892,946 B2
(45) Date of Patent: Jan. 12, 2021

(54) SYSTEMS AND METHODS FOR MANAGING A MOBILE NETWORK INFRASTRUCTURE IN A NETWORK OF MOVING THINGS

(71) Applicant: Veniam, Inc., Mountain View, CA (US)

(72) Inventors: Rui Miguel Correia e Costa, Sintra (PT); Guilherme da Silveira Pacheco, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 16/186,832

(22) Filed: Nov. 12, 2018

(65) Prior Publication Data

US 2019/0173753 A1 Jun. 6, 2019

Related U.S. Application Data

(60) Provisional application No. 62/594,800, filed on Dec. 5, 2017.

(51) Int. Cl.
*H04L 12/24* (2006.01)
*H04W 76/10* (2018.01)
*H04W 28/08* (2009.01)
*H04W 84/04* (2009.01)

(52) U.S. Cl.
CPC ......... *H04L 41/0823* (2013.01); *H04W 28/08* (2013.01); *H04W 76/10* (2018.02); *H04W 84/042* (2013.01)

(58) Field of Classification Search
None
See application file for complete search history.

(56) References Cited

U.S. PATENT DOCUMENTS

| 2017/0161973 A1* | 6/2017 | Katta | G06Q 40/08 |
| 2018/0128628 A1* | 5/2018 | Cheaz | G01C 21/3438 |
| 2018/0288502 A1* | 10/2018 | Higuchi | G07C 5/0841 |
| 2018/0365909 A1* | 12/2018 | Cheng | G07C 5/008 |
| 2019/0090174 A1 | 3/2019 | Rocci et al. | |

\* cited by examiner

*Primary Examiner* — Yaotang Wang
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). In particular, systems and methods for managing a mobile network infrastructure in a network of moving things.

21 Claims, 13 Drawing Sheets

SYSTEMS AND METHODS FOR MANAGING A MOBILE NETWORK INFRASTRUCTURE IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/594,800, filed on Dec. 5, 2017, and titled "Systems and Methods for Managing a Mobile Network Infrastructure in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
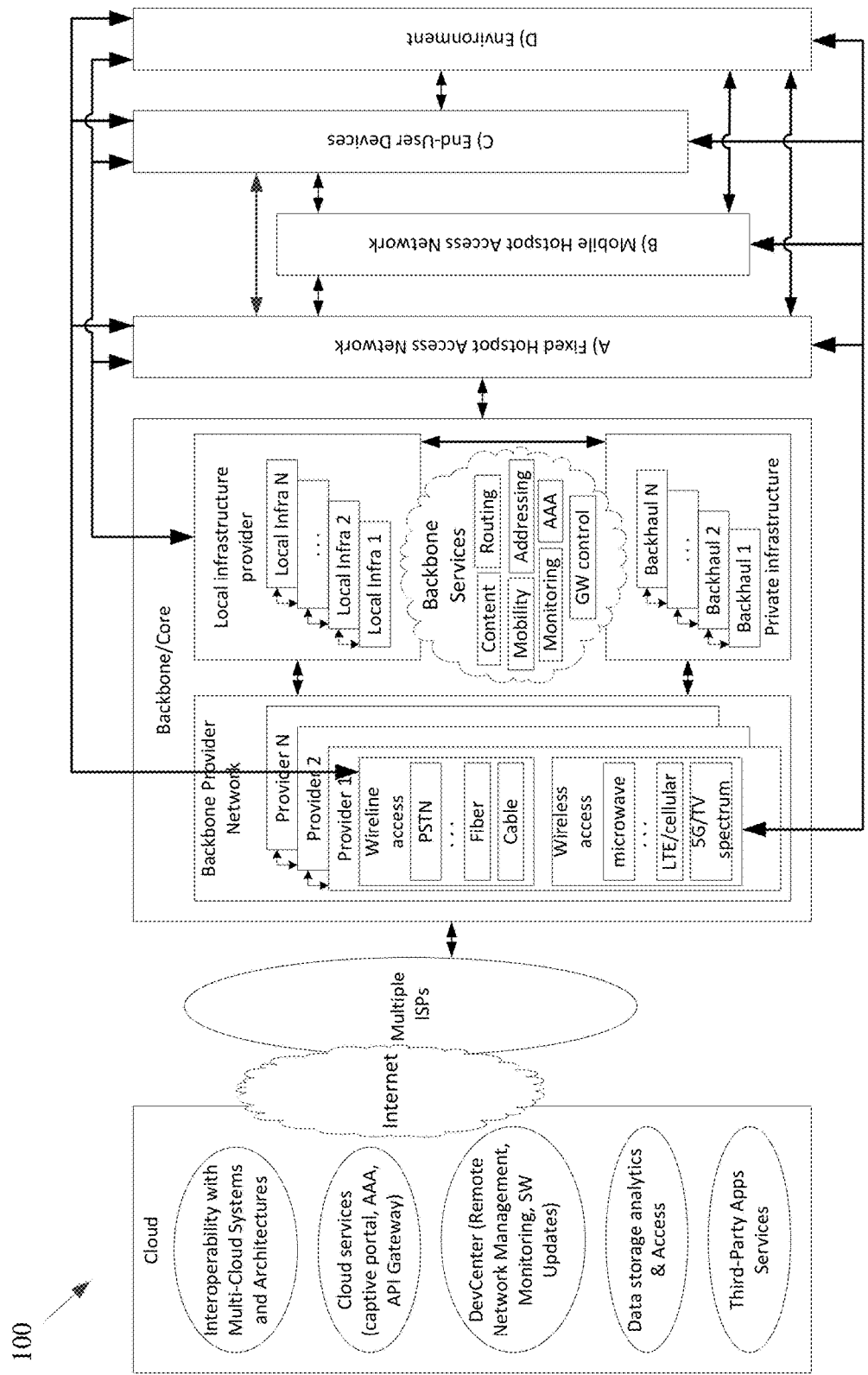
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
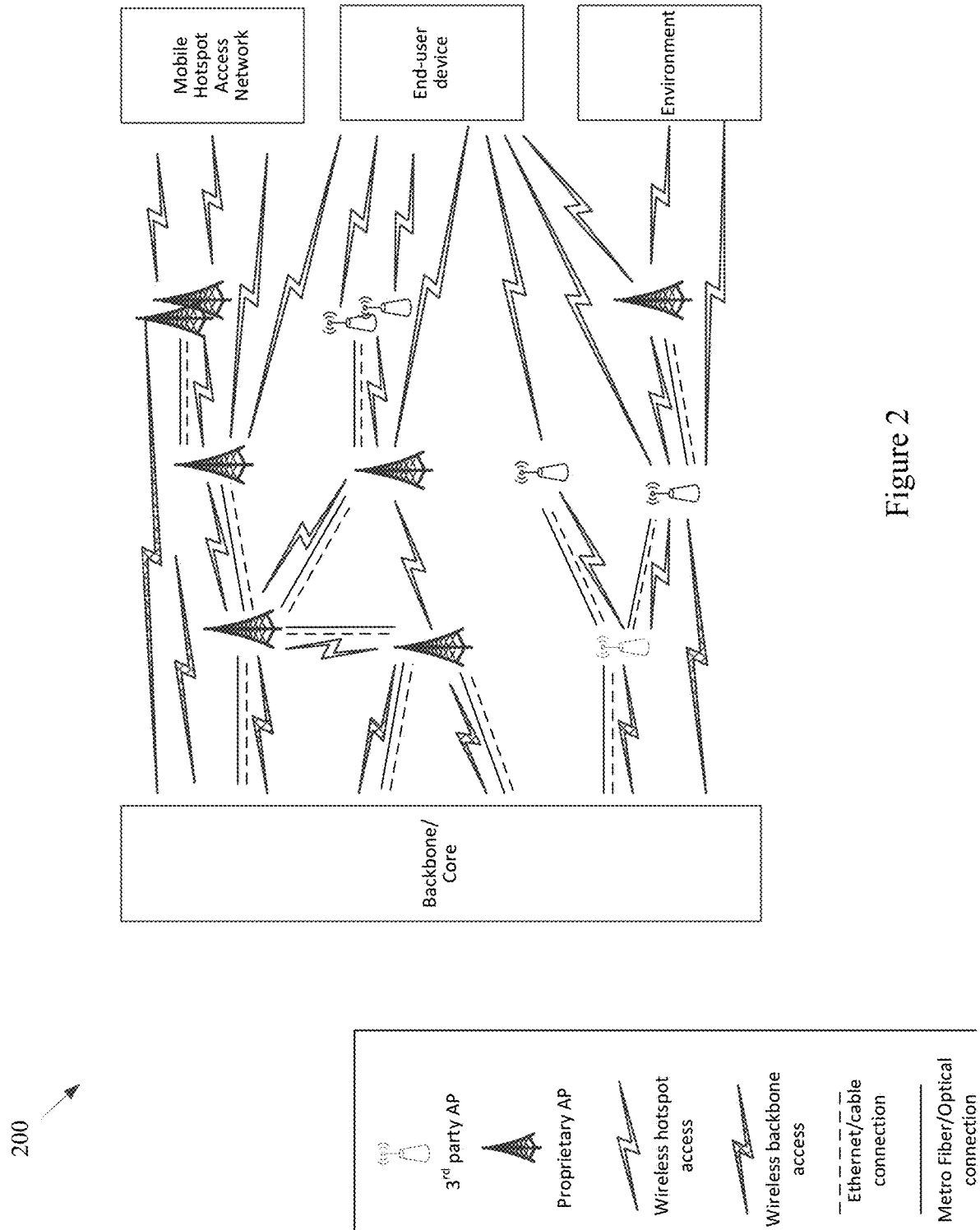
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
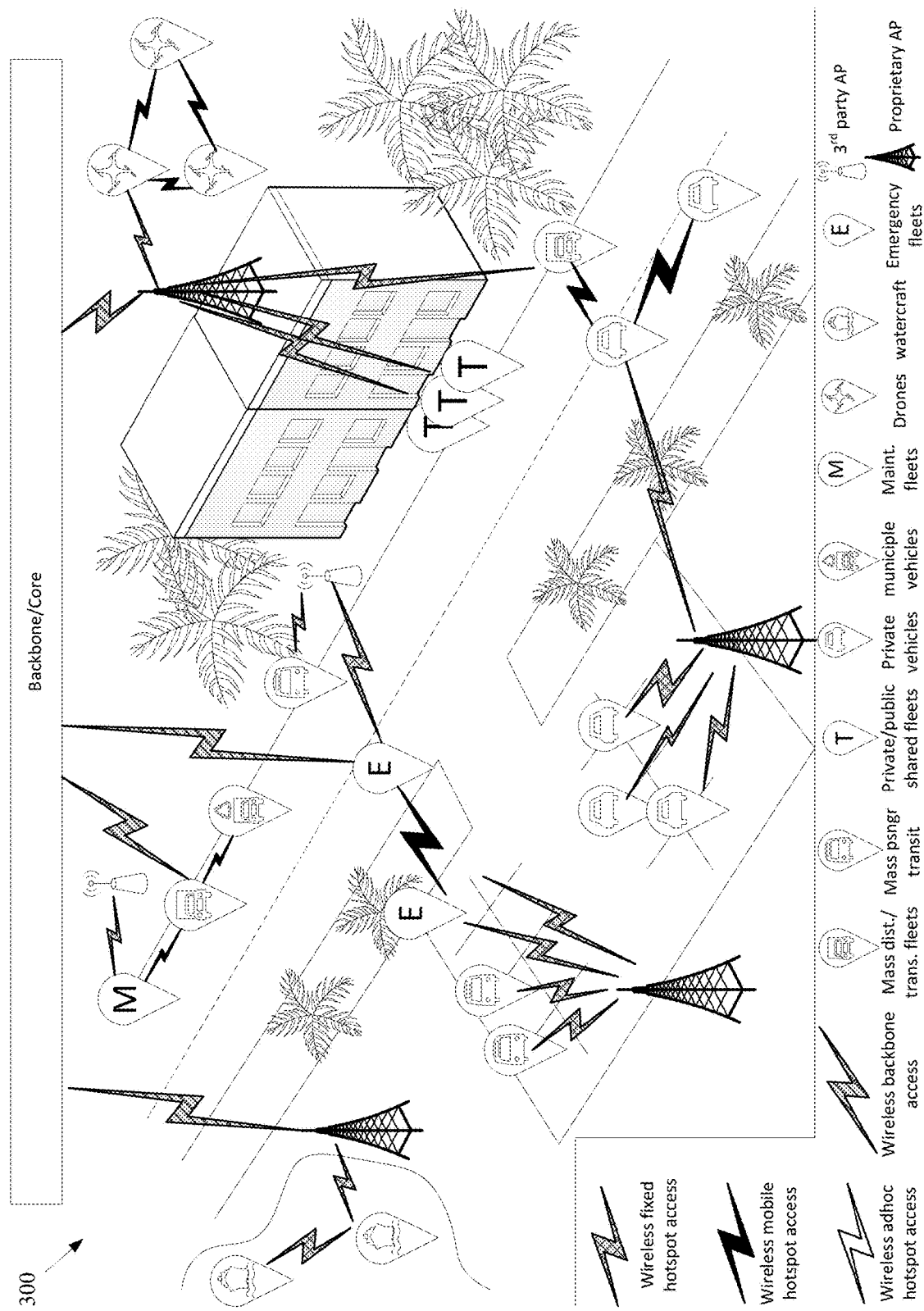
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
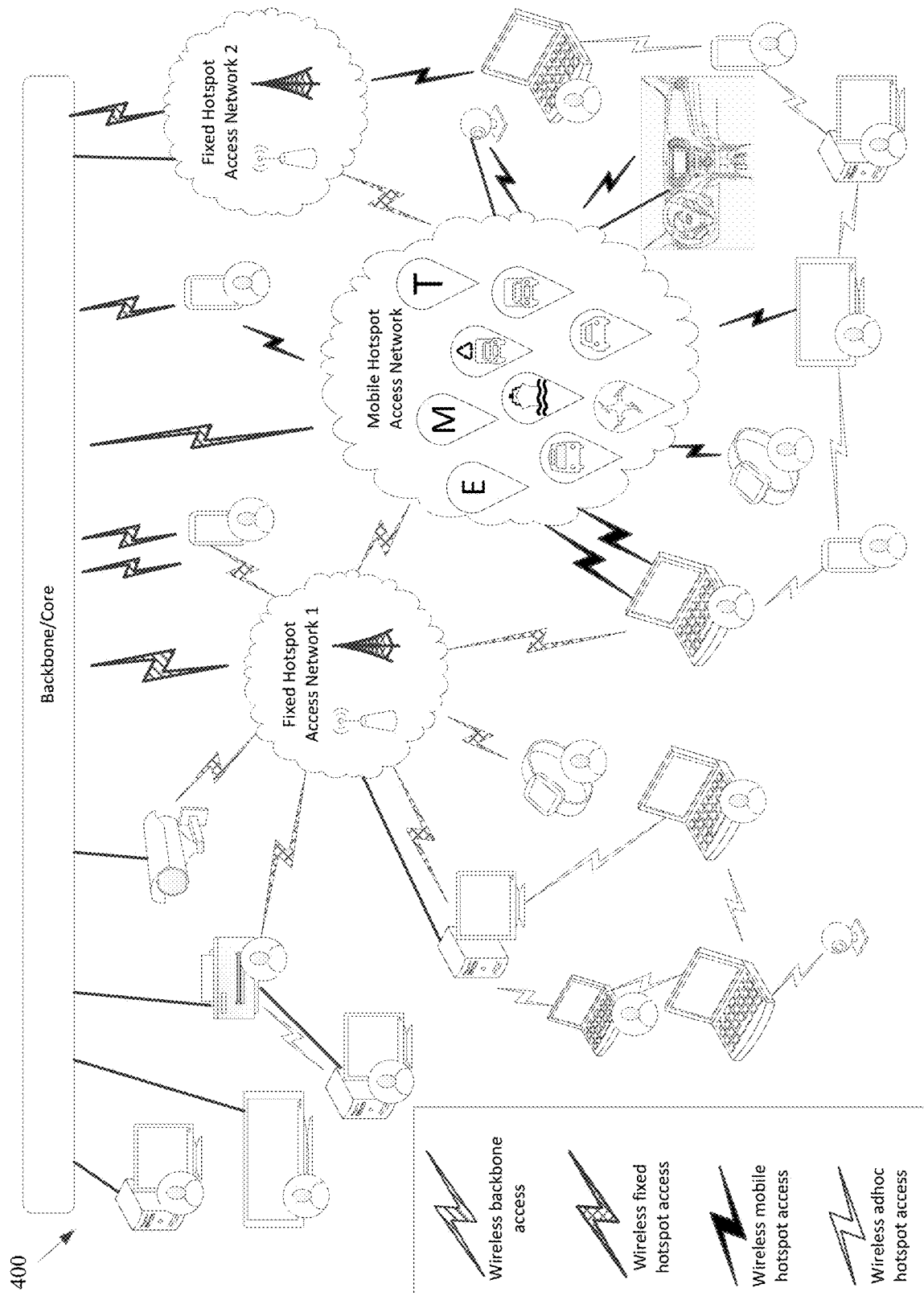
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
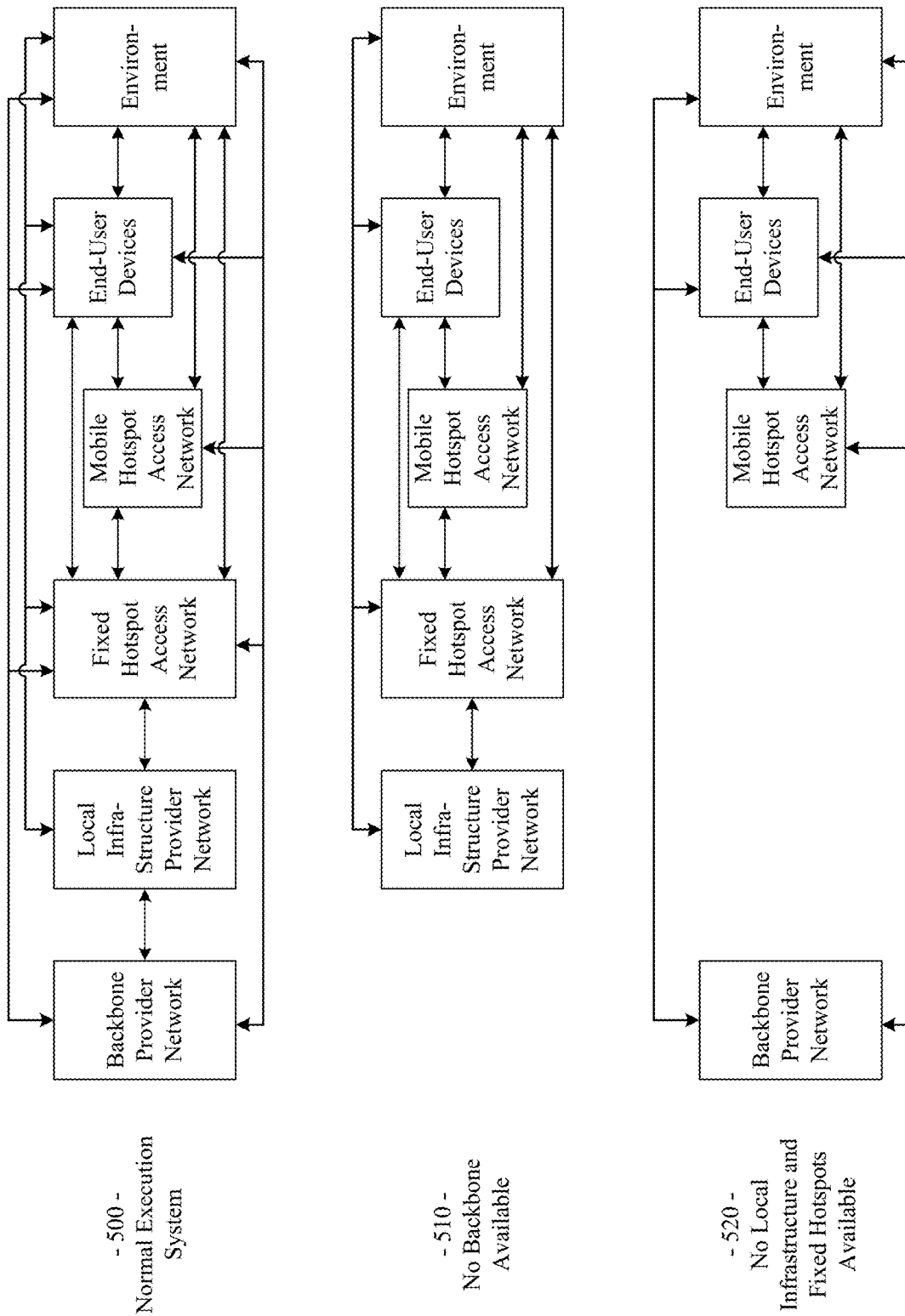
FIGS. 5A-5C show a plurality of network configurations illustrating the flexibility and/or and resiliency of a communication network, in accordance with various aspects of this disclosure.
Figure 5B:
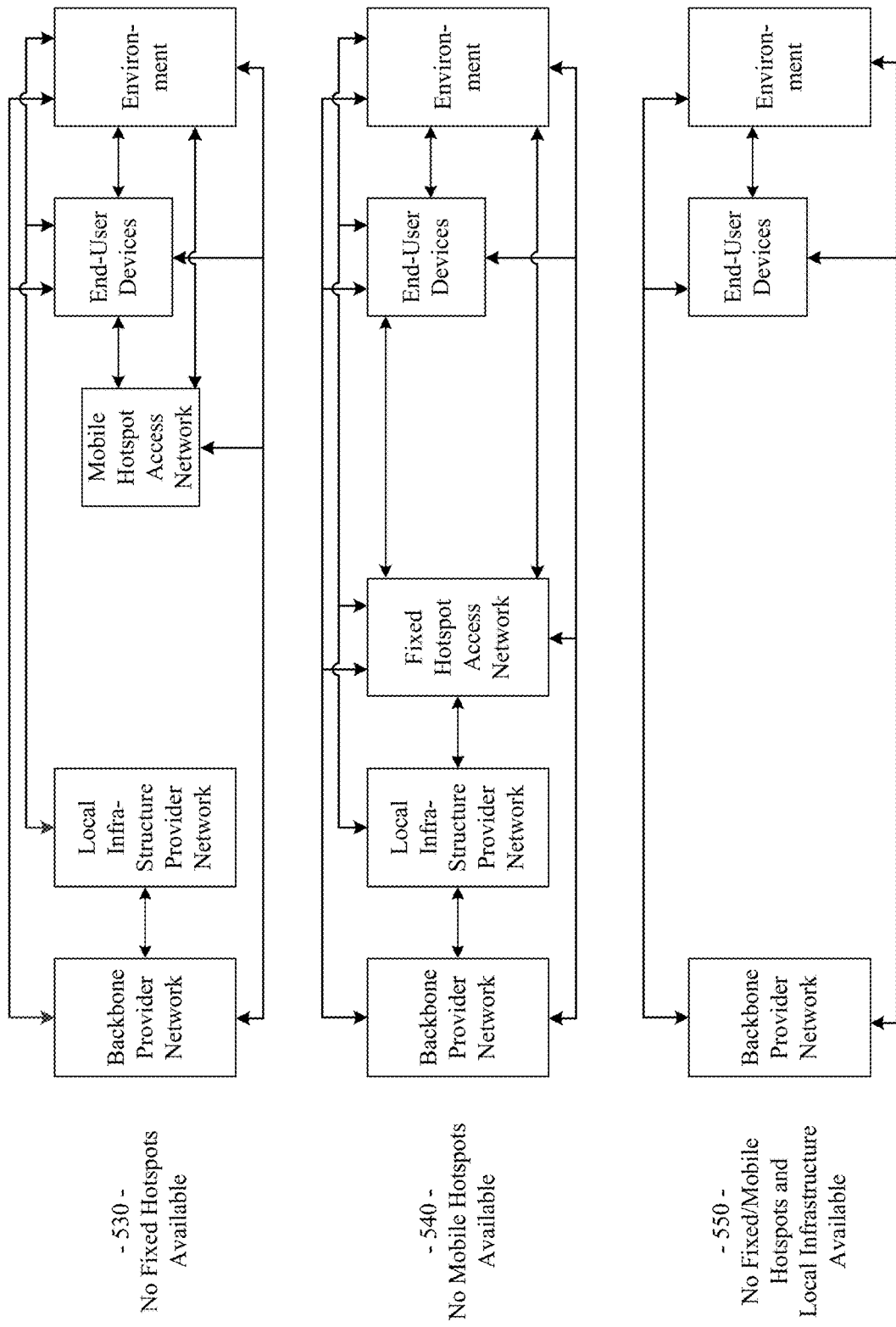
Figure 5C:
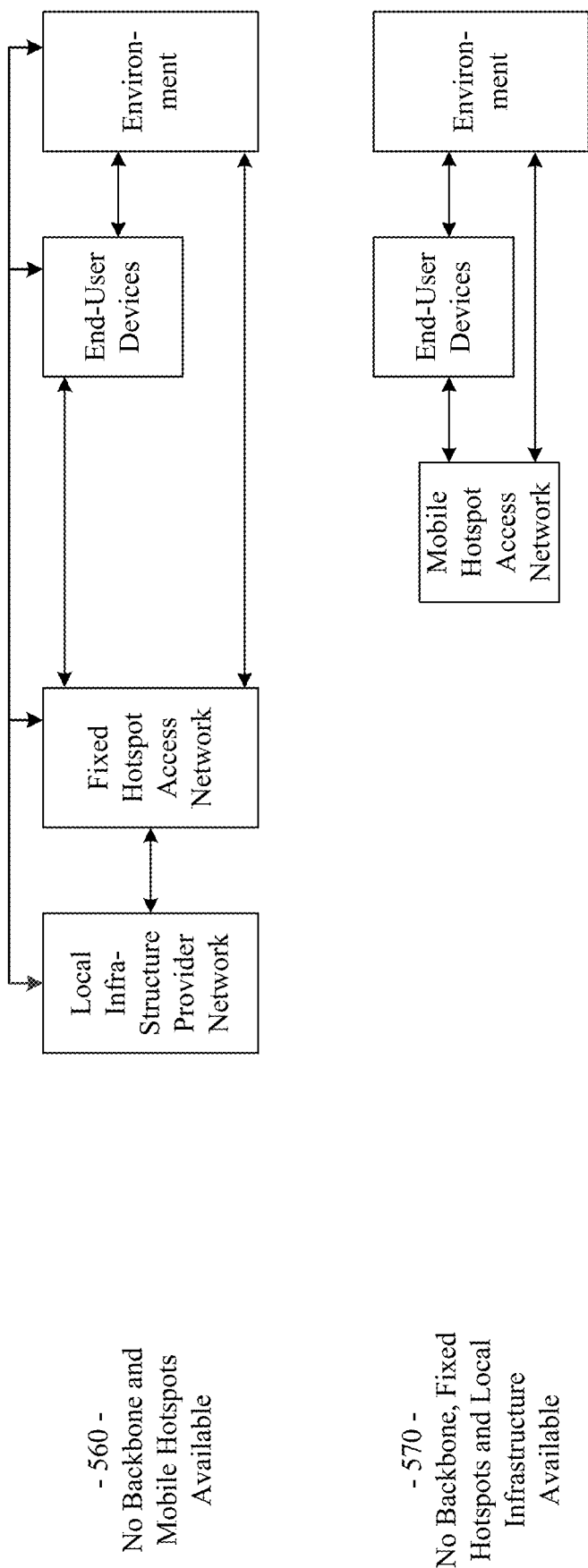

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
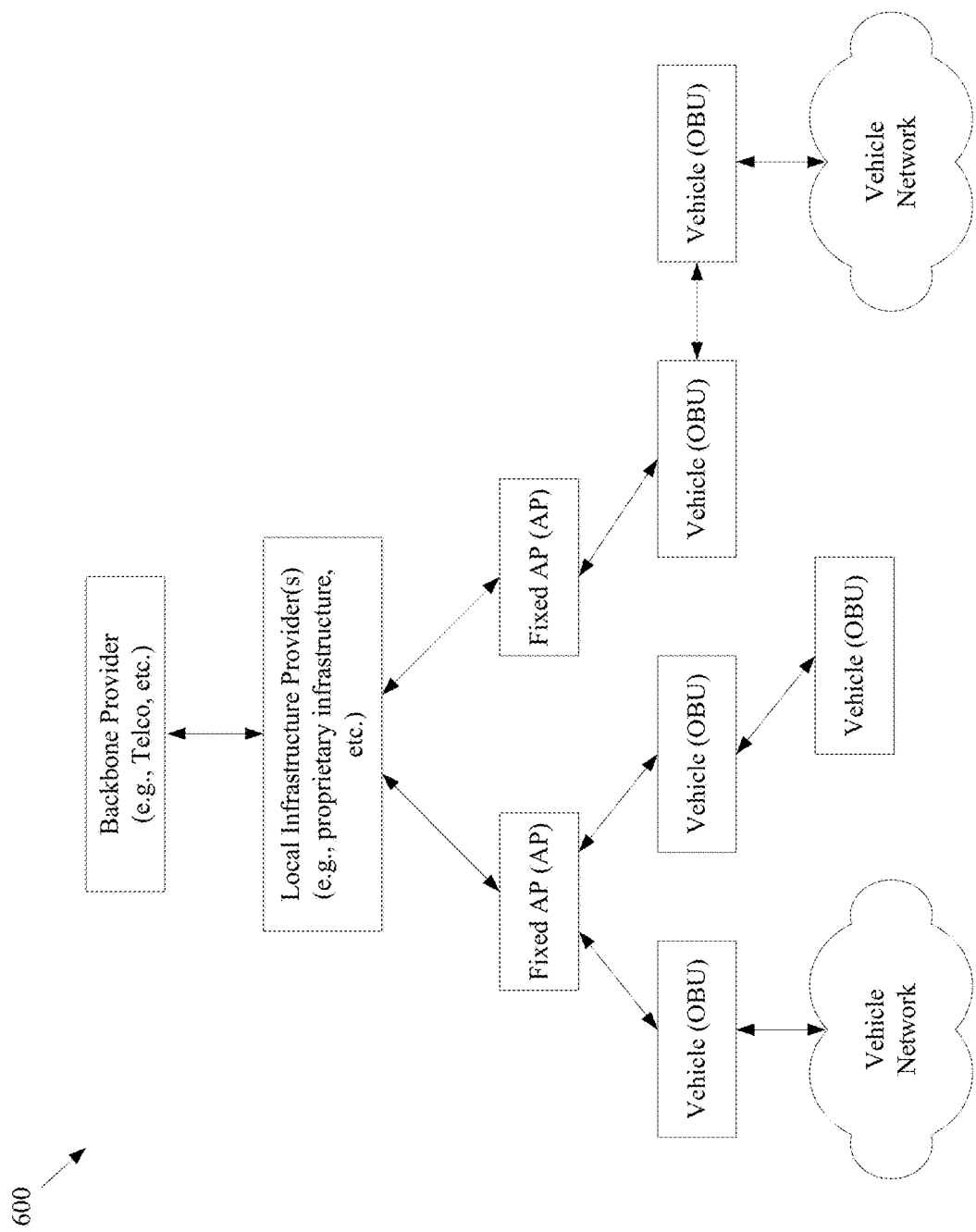
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Within a network of moving things, there exists a dynamic network environment in which the configuration and arrangement of nodes, and the radio frequency environment, are constantly changing, which influences the operation of each node of the network, and the way that the nodes communicate with one another. It is expected that nodes/devices of such a network may be constantly changing their physical location, the type of communication connection in use (e.g., real-time, delay-tolerant), and the wireless connection technology (e.g., Dedicated Short Range Communication (DSRC), Wi-Fi, cellular) being employed. The node environment in such a network is always changing, which brings constant variation of the density of nodes in a given geographic area, the number of end-user devices wirelessly connected to each network node, the variety of node services in use, the traffic carried by the network, and the level/quality of the service(s) (QoS) provided. In such a dynamic scenario, nodes of the network may constantly monitor the node and network resources in use by the various applications running on the node and by the end-users connected to each node of the network. A number of factors of network operation may change with time and node location, factors that affect the metering, accounting, and billing for use of network resources (e.g., computing, storage, data communication) by nodes, applications, and end-users of a network according to various aspects of the present disclosure.

For example, the communication technology used by nodes of the network may be constantly evaluated and adapted to the communication needs of the node and of the network as a whole including, for example, whether each of the communications between various nodes operate as a delay-tolerant/disruption-tolerant network (DTN), or involves real-time communication. In various situations, nodes of the network may make use of a commercial cellular network, a Wi-Fi network, and/or a DSRC network. In addition, the nodes of the network may aggregate the bandwidth/capacity available from several different networks using different communication technologies to provide bandwidth needed by the system of the node or services running on the node. To enable an operator of a network, such as the network of moving things described herein, to accurately track, account, and bill for network usage, and to comply with government requirements such as, for example, revenue reporting and taxation, a network according to the present disclosure may monitor and record a large number of details of node and network resource consumption including, for example, a type of resource, an amount of resource usage, a geographic location associated with use of the resource, and a time of use of the resource, to name but a few examples.

The nodes of a network according to various aspects of the present disclosure may record or log the technology specifics for each communication interface of each node including, for example, which type of communications interface is in use for a particular communication link, and whether particular communications interfaces are enabled or disabled, and may track the mode in which a Wi-Fi-capable communications interface (e.g., IEEE 802.11a/b/g/n/ac/ad/af) is set to operate/is operating as, e.g., a Wi-Fi Access Point (AP), or a Wi-Fi Station (STA). Monitoring of technology-specific aspects of communication interfaces of nodes may also include, for example, the communication network with which the node is connected, and the location of the node with respect to geographic boundaries (e.g., "geographic fences" or "geo-fences") used to define where application of, for example, tariffs, various parameters of operation, billing, and taxation for node and network resource usage are to be applied. Monitoring/tracking of various aspects of node operation may be performed including, for example, radio-frequency spectrum use, geographic areas or regions in which communication takes place, and the name(s) and/or geographic/physical locations of the gateway(s) or access point(s) (i.e., Access Point Name (APN)) used to link to a mobile cellular network (e.g., Global System for Mobile communication (GSM), General Packet Radio Service (GPRS), 3G, 4G, 5G, Code Division Multiple Access (CDMA), Time Division Multiple Access (TDMA), or other cellular network) and/or computer network (e.g., frequently the public Internet). In addition, nodes of a network according to aspects of the present disclosure may monitor, track, and/or record their primary role or main mode of operation within the network of moving things as a whole including, for example, whether the node is acting as an on-board unit (OBU), an access point (AP) (e.g., a fixed AP), a router, and/or a network controller/mobility controller (NC/MC), for use in metering, accounting, and/or billing of use of node and/or network resources.

Network nodes in accordance with various aspects of the present disclosure have the ability to monitor, track, and/or record details of node and/or network operation including various types of context information. Such context information may include, for example, information about the physical (e.g., radio frequency, node/network element, geographic location (e.g., geographic coordinate (latitude/longitude))) and/or network environment (e.g., topology or wider network traffic/loading and equipment issues) surrounding each particular node/network element. Additional examples of context information that may be used for management of network operation (e.g., monitoring, tracking, recording, metering, accounting, and billing of resource usage) may be found, for example, in U.S. patent application Ser. No. 15/456,441, titled "Systems and Methods for Managing the Routing and Replication of Data in the Upload Direction in a Network or Moving Things," filed Mar. 10, 2017; U.S. patent application Ser. No. 15/478,181, titled "Systems and Methods for Managing the Routing and Replication of Data in the Download Direction in a Network or Moving Things," filed Apr. 3, 2017; U.S. patent application Ser. No. 15/481,732, titled "Systems and Methods for Managing the Scheduling and Prioritizing of Data in a Network of Moving Things," filed Apr. 7, 2017; and U.S. patent application Ser. No. 15/499,658, titled "Systems and Methods for Managing the Storage and Dropping of Data in a Network or Moving Things," filed Apr. 27, 2017, the complete subject matter of each of which is hereby incorporated herein by reference, in its respective entirety. Such items of context information may be received either from other nodes of the network, or from one or more cloud-based systems (e.g., one or more servers having information about the elements of the entire network/system).

In accordance with various aspects of the present disclosure, nodes of a network as described herein may have multiple wired network interfaces (e.g., wired/optical network interfaces (e.g., Ethernet, cable, optical fiber, etc.)) and/or wireless network interfaces. Wireless network interfaces may include, for example, devices/radios for communication using wireless (radio frequency (RF)) communication technologies such as Wi-Fi, GSM, 3G, 4G, LTE, 5G, and/or Dedicated Short Range Communication (DSRC) (e.g., IEEE 802.11p). A node of a network as described herein may be equipped with one or several wireless network interfaces for each communication technology. A node may also be equipped with one or more sensors such as, by way of example and not limitation, a satellite-based geolocation receiver (e.g., a receiver of signals from a Global Navigation Satellite System (GNSS)/Global Positioning System (GPS)); and atmospheric pressure, humidity, precipitation, and/or temperature sensors; a sensor of light intensity; sensors for detecting various gases such as oxygen, ozone, oxides of nitrogen, sulfur dioxide; sensors or links to vehicle systems that provide vehicle movement information (e.g., speed, heading, lack of movement), and others. According to various aspects of the present disclosure, access to such information by, for example, applications running on the node, by end-user devices connected to the node, and/or by other network and/or third party systems (e.g., cloud-based systems) may be monitored, tracked, and/or recorded for use in metering, accounting, and/or billing for such access and use. Such sensor information for a node or group of nodes may be gathered from the network interfaces and sensors of the node, from one or more neighbor nodes, and from one or more cloud-based system(s), in accordance with various aspects of the present disclosure.

A number of different types of network nodes are described above including, for example, a fixed access point (i.e., fixed AP (FAP), which may also be referred to herein as a road-side unit (RSU)), and a mobile access point (i.e., mobile AP (MAP), which may also be referred to herein as an on-board unit (OBU)). A FAP/RSU in accordance with the present disclosure may be described as a node that is located at a fixed geographic/physical location, is equipped with a high-bandwidth backhaul connection that enables wireless access for real-time Internet or other access, and that enables offload of stored data from mobile nodes operating as delay-tolerant/disruption-tolerant carriers of data. In contrast, a MAP/OBU in accordance with the present disclosure may be described as a node that acts as a mobile (e.g., vehicle resident) point of real-time and delay-tolerant wireless network access for end-user devices (e.g., smart phones, tablet computers, laptop computers, etc.) and various types of sensors (e.g., environmental, vehicle, etc.), and that wirelessly or physically transfers data from sensors, end-user devices, and other MAPs, for delivery to another MAP or a FAP/RSU. In a basic form, a network of moving things according to various aspects of the present disclosure may comprise one or more on-board units (OBUs) installed in respective vehicles, one or more access points (FAPs) that are at fixed geographic/physical locations, and one or more computer systems (e.g., servers that may be cloud-based) accessible via the Internet.

Figure 7:
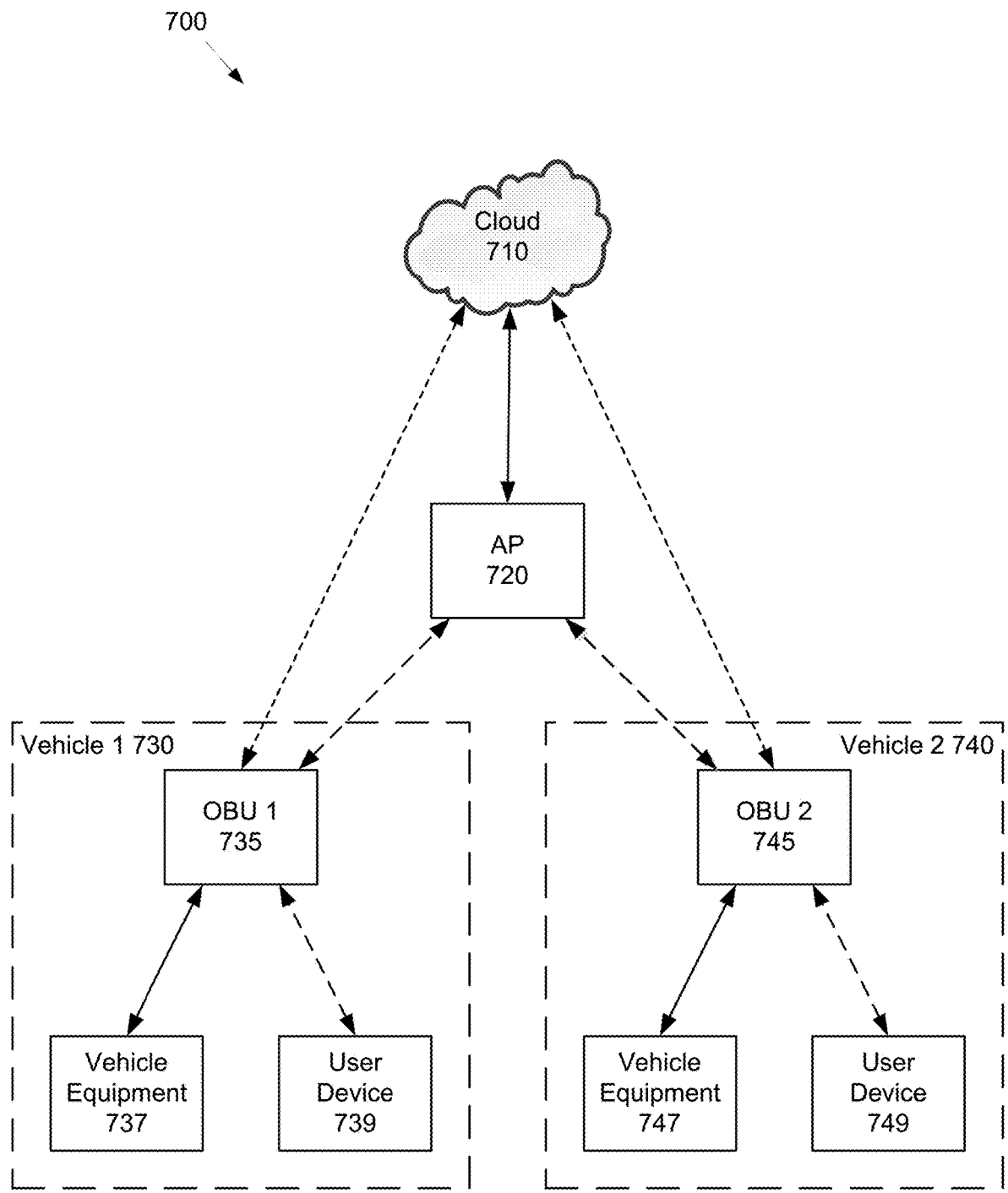
FIG. 7 is a block diagram of a basic network of moving things, in accordance with various aspects of the present disclosure.

FIG. 7 is a block diagram of a basic network of moving things 700, in accordance with various aspects of the present disclosure. As shown in the illustration of FIG. 7, a fixed access point (FAP) 720 is connected by a communication link (e.g., a wired or wireless link that may include the Internet) to one or more computer systems (e.g., servers—not shown) of a cloud 710. Each of the vehicles 730, 740 of FIG. 7 is equipped with a respective on-board unit (OBU) 1 735, 2 745. In the illustration of FIG. 7, the OBUs 1 735, 2 745 are communicatively coupled to respective vehicle equipment 737, 747 (e.g., sensors; vehicle systems such as operation, navigation, entertainment, and autonomous vehicle systems), and respective end-user devices 739, 749 (e.g., smartphone; tablet computer; laptop computer; or other wireless-enabled end-user device). It should be noted that, although FIG. 7 shows only one end-user device 739 at vehicle 1 730 and one end-user device 749 at vehicle 2 740, this does not represent a limitation of the present disclosure, as a different number of end-user devices may be present at each of vehicle 1 730 and vehicle 2 740, without departing from the scope and spirit of the present disclosure. When one of the vehicles 730, 740 equipped with respective on-board units 735, 745 comes within wireless communication range of the FAP 720, a respective wireless communication link (e.g., a Wi-Fi-based local area network (LAN), DSRC network) may be established between the OBU 735, 745 and the FAP 720. In this way, the OBU 735, 745 that is within wireless communication range of the FAP 720 may connect to the cloud 710 via the wireless communication link which, for communication technologies such a Wi-Fi (e.g., IEEE 802.11a/b/g/n/ac/ad/af) and DSRC may be an inexpensive (e.g., low equipment and operating cost) wireless communication link. Other wireless communication technologies (e.g., IEEE 802.11p, Bluetooth® (IEEE 802.15.1), Zigbee® (IEEE 802.15.4), etc.) may also be used. The OBUs 735, 745 may also establish one or more wireless communication links with the other of the OBUs 735, 745 (or others of the network, not shown), and may form what may be referred to herein as a "mesh network" that permits data to be wirelessly communicated to/from a FAP such as the FAP 720 via intermediate OBUs. In instances in which there is no FAP within wireless communication range, either directly or indirectly via another OBU, an OBU (e.g., OBUs 735, 745) may connect to the cloud 710 via a more "expensive" alternative communication technology such as, for example, a cellular communication link (e.g., 3G, 4G, 5G, LTE, GSM, GPRS, CDMA, TDMA, etc.). During normal operation of the vehicles 730, 740, there may be data to be sent to or received from the cloud 710. Such data may be generated by the OBUs 735, 745 themselves, by the vehicle equipment 737, 747 (e.g., sensors, etc.) and/or by end-user (e.g., driver/passenger) devices including, for example, various types of smartphones, personal computers (PCs), digital tablets/tablet computers, cameras, and the like. A system in accordance with various aspects of the present disclosure may track, monitor, and/or record details regarding the establishment, operation, and teardown of communication links used by nodes of a network of moving things as described herein.

Thus, a network in accordance with various aspects of the present disclosure may have different entities such as, for example, the owner(s) of the vehicles 730, 740; the passengers/riders in the vehicles 730, 740; owner(s)/operator(s) of the infrastructure of the network 700; third-party entities using vehicles (e.g., cars, taxis, trucks, trains, etc.) as services (e.g., advertising, sensor data collection, data transport); and regulatory entities using a mobile network infrastructure such as that shown in FIG. 7, to move data locally (e.g., between network nodes such as OBUs 735, 745 FAP 720) and to/from the cloud 710, but also monitoring the usage of the network 700. In accordance with various aspects of the present disclosure, vehicles (e.g., vehicles 730, 740) may behave as active nodes that are part of the networking/telecommunication infrastructure of the city/village/geographic region within which they are located.

When planning and building a mobile networking infrastructure, it may be difficult to predict where vehicles will be located or travel, and what services the vehicles may be called upon to provide (e.g., Wi-Fi, multi-hop, operate as a hub for in-vehicle devices, provide access to local APIs, service mobile advertisements, etc.) or for how long they will be providing services. Nevertheless, it may be desirable and/or required that the usage of various network resources be tracked, monitored, or metered; that usage accounting be maintained, and that billing/charging be performed. Also, regulatory entities (e.g., government entities, city authorities, etc.) may impose taxes/fees/surcharges upon the owner(s)/operator(s) of the network, upon clients running applications on the network infrastructure, and/or upon the end-users wirelessly connecting to the network including, for example, customers using OBU-equipped vehicles as networking infrastructure points (e.g., as temporary fixed (FAPs/RSUs) and or mobile (but temporarily parked) MAP/OBU) devices. For example, there are a number of possible scenarios in which OBUs (e.g., OBUs 730, 740) may be owned by a vehicle (e.g., automobile, taxi, van, truck, etc.) owner or by a vehicle manufacturer or by the owner(s)/operator(s) of the network infrastructure. Such scenarios may call for systems capable of handling multiple levels of charging, depending on the types of services and communication technologies being used to electronically or physically move data. Therefore, a system for managing operation of a network of moving things in accordance with aspects of the present disclosure includes mechanisms to measure, account, and bill the usage of vehicles and vehicle communication system resources as part of the networking/telecommunication infrastructure.

To enable measurement, accounting, and billing for network usage, a system according to the present disclosure tracks, monitors, and stores context information for each vehicle operating as a node within the infrastructure of the network of moving things. The context information collected is used, in part, to derive data for the taxes, fees, and/or surcharges that may be levied by the regulatory entities upon the companies that operate, manage, and/or control the network infrastructure. Such information may also be used to determine fees charged by the network operator/owner for the services and/or resources used by the client(s) or end-user(s).

To ensure that the network owner/operator may accurately assess or bill clients and/or end-users for network usage (i.e., network "traffic"), the records (e.g., logs of usage and context information) from each network node (e.g., each FAP or each OBU in a vehicle) involved in serving data communication activity or traffic may maintain a number of different data items including, by way of example and not limitation, geographic/physical location information (e.g., specific geographic coordinates (e.g., latitude/longitude) of a vehicle or node position); information that identifies (e.g., by a designator, number, and/or type) a vehicle and/or OBU and one or more services running in the identified vehicle/

OBU; and a communication technology used (e.g., 3G, 4G, 5G, DSRC single-hop (DSRC-SH), DSRC multi-hop (DSRC-MH), etc.); and type of communication link used (e.g., real-time, delay/disruption-tolerant, etc.) in communicating user traffic. In addition, the records from each network node may include, by way of example and not limitation, information identifying the identity of the user responsible for the network traffic and a "type" or "kind" corresponding to the user responsible for the traffic including, for example, a vehicle (e.g., car) passenger, a source of vehicle driving information, an advertising agency, etc.). Such records/log entries may also include an amount of traffic being generated by the source/transported by the network; and/or a data communication "level" that identifies whether the traffic is moving within a localized portion of the network (e.g., within a group of nodes (e.g., FAPs and/or OBUs) or that the traffic is being communicated from/to a FAP/OBU to/from the cloud. In addition, records from each network node may include time information that identifies when and/or how long a network node (e.g., an OBU of a vehicle) was connected using a certain type of communication link and/or kind of communication technology, using a specific service, etc. In accordance with aspects of the present disclosure, such records/log entries may, for example, be stored locally at each node (e.g., each OBU, each FAP) and then sent to the cloud (e.g., cloud 710 of FIG. 7) to be processed and billed to the specific network users of the identified resources.

A system for managing operation of a network of moving things according to aspects of the present disclosure includes security mechanisms used in communicating the network usage data logs or records between elements of the network. The network usage records/logs may be stored and transported in a secure way, both at a vehicle and a cloud level, so that the owner/operator(s) managing and controlling the network infrastructure are not able to change the usage data records/logs. In accordance with aspects of the present disclosure, the usage data records/logs may, for example, be signed with a public key/certificate provided by the a government or regulatory entity, so that only entities that are authorized to have access to data records/logs are able to decrypt the contents of the data records/logs.

In accordance with aspects of the present disclosure, various nodes of a network as described herein (e.g., OBUs of vehicles, FAPs) record/log, store, transport, and communicate such network usage data records/logs to one or more systems in the cloud (e.g., cloud 710), so that the usage data records/logs may then be available and accessible in the cloud using, for example, various data application program interfaces (APIs). It is preferable to optimize network utilization by transferring such network usage data in the most "intelligent" way, in order to achieve a high degree of scalability. A network in accordance with aspects of the present disclosure may send network usage records/logs to the users/consumers/processors of such data (e.g., one or more cloud-based systems) not in real time as it is generated, but in a delay-tolerant fashion. A condition for the use of such an approach may be only that all network usage or other data necessary for invoicing/billing of network clients/end-users be available at the user/consumer/processor of such network usage records/logs by a deadline, a specific date/time (e.g., the last day of each month, noon on the day after the end of a billing period, etc.), which may be defined, for example, by each entity that tracks, accounts, and/or bills for utilization of the network ecosystem. In such an approach, delay-tolerant network usage or other data may be queued, and later sent opportunistically (i.e., when certain types of communication links are available) over a low-cost wireless (e.g., Wi-Fi LAN) communication link, thereby minimizing the use of more expensive (e.g., cellular) communication links. This strategy may be referred to herein as "push with delay-tolerant capability," where data is "pushed" from a source (e.g., vehicle OBU) to a destination (e.g., cloud). The approach described above enables the communication of network usage data records/logs of a network of moving things without affecting the quality of service (QoS) or quality of experience (QoE) provided to the clients/end-users that pay for the services provided by the network.

In accordance with various aspects of the present disclosure, different types of taxation may be applied to the information in the network usage records/logs, based on a number of different variables including, by way of example and not limitation, the amount of client/end-user data transferred over the network; the rate(s) of taxation for different "fenced"/"geo-fenced" geographic regions served by the network; the type(s) of communication technology(ies) employed in communicating data for the client/end-user; the identity of the client/end-user that generated the network traffic; and the locality of the services/resources consumed.

As noted above, the taxation applied to network charges may, for example, be based on an amount of client/end-user data transferred. For example, the owner(s)/operator(s) of the network infrastructure may charge for network traffic usage by using different data plans, and authorities may also raise/reduce the taxation percentage on the network usage depending on the level of data transferred over the network (e.g., bandwidth used/data consumption). In addition, clients/end-users of data in certain geographic regions may be charged based on the socio-economic or purchasing power of the certain geographic region: lower taxing levels may be applied to charges for network usage by clients/end-users in geographic regions having lower earning/purchasing power.

In some aspects of the present disclosure, taxation applied to network usage charges may also depend on the communication technology being used (e.g., 3G, 4G, 5G, LTE, Wi-Fi, DSRC, etc.), and may also take into account the application running on the network node (e.g., on a FAP or OBU) to or from which the data traffic was directed or sent. Further, the purpose of/reason for the network usage may affect taxation. If network usage data shows that a DSRC communication link was used for the communication of safety or emergency messages/communication, taxation applied to that network usage may, for example, be zero. The taxation of network data usage may also be different depending upon the identity of the entity generating the network traffic. For example, a car owner (e.g., an individual or a company) that uses the network to communicate data needed to run the car and/or to interact with other cars (e.g., vehicle-to-vehicle (V2V) and vehicle-to-infrastructure (V2I) communications employed by autonomous vehicles) may be taxed at a lower rate when compared to a company that uses data to enable advertisements to be displayed in cars.

In accordance with some aspects of the present disclosure, the rate of taxation applied to network usage may depend on a measure of "locality" of the communication. Communication that occurs between nodes of the network (e.g., among OBUs and FAPs, without involving the cloud) may have a lower rate of taxation applied to charges for that network usage compared to a rate of taxation applied to network usage that involves communication with a computer system located in the cloud (e.g., cloud 710 of FIG. 7), or that involves communication via the Internet. Lower vs.

higher rates of taxation for those forms of network usage that do not have widespread impact upon data networks over a broader geographic region may be used to encourage clients/end-users to limit the network scope via which they communicate, helping to discourage network usage that impacts a broader group of clients/end-users.

A system in accordance with various aspects of the present disclosure may use the stored network usage records/logs information to create both new taxation and new service consumption charging rules for the various entities that operate within the network ecosystem.

A network in accordance with various aspects of the present disclosure may be used to support updates of tariffs and taxation information used in managing the operation of the network. It is noted that tariffs (e.g., schedules of rates or charges of a business or public utility) and taxation rules (e.g., rules that define taxation rates to be applied by a taxing body according to resource or service used, geographic region/municipality/physical location at which the taxation rates apply) may change from time to time, and network clients/end-users may wish to monitor their network usage costs in as close to a real-time basis as possible. Installation and operation of elements of a network of moving things may take place over a geographic area/region that crosses municipal, provincial, state, country, or other governmental, taxation, and/or regulatory boundaries. A network of moving things in accordance with aspects of the present disclosure provides the ability to track/monitor tariffs and taxation rules to enable clients, end-users, and owners/operators of elements/nodes of a network of moving things to better manage network operation and usage, and to meet regulatory and/or taxation authority requirements. The various elements/nodes of a network of moving things in accordance with various aspects of the present disclosure such as, by way of example and not limitation, the cloud, fixed APs/RSUs, mobile APs/OBUs, NCs/MCs, etc. support the collection, distribution, and maintenance of the various items of context information that may be involved in performing billing and taxation related to network use or operation. Example targets of such billing and taxation include, by way of example and not limitation, the network owner/operator, the owner(s)/operator(s) of vehicles (e.g., automobiles, taxis, trucks, buses, autonomous vehicles, etc.) served by the network, and the end-users of the services provided by and/or through the network. Such items of context information that may be measured/tracked/collected/maintained to enable billing and/or taxation for use of such a network may include, by way of example, and not limitation, communication technology(ies) used (e.g., one or more communication links that are wired/wireless, bandwidth/data rate); date/time of use (e.g., weekday/weekend, business day/after hours); and amount of usage (e.g., below or above one or more threshold amounts measured in packets/bytes/kilobytes/megabytes/gigabytes). Such items of context information may also include, by way of example and not limitation, priority of communication (e.g., "low," "medium," "high," "pre-emptable," "emergency," "express", etc.); quality of service (QoS)/quality of experience (QoE) (e.g., "low," "medium," "high," "standard," "premium," etc.); geographic location (e.g., geographic coordinates (e.g., latitude/longitude), identification of one or more geographic regions/municipalities/states/provinces/countries) of node/user during use; and/or one or more rates of taxation for each taxing entity by each geographic location of use; etc. The following discusses three example scenarios.

Figure 8:
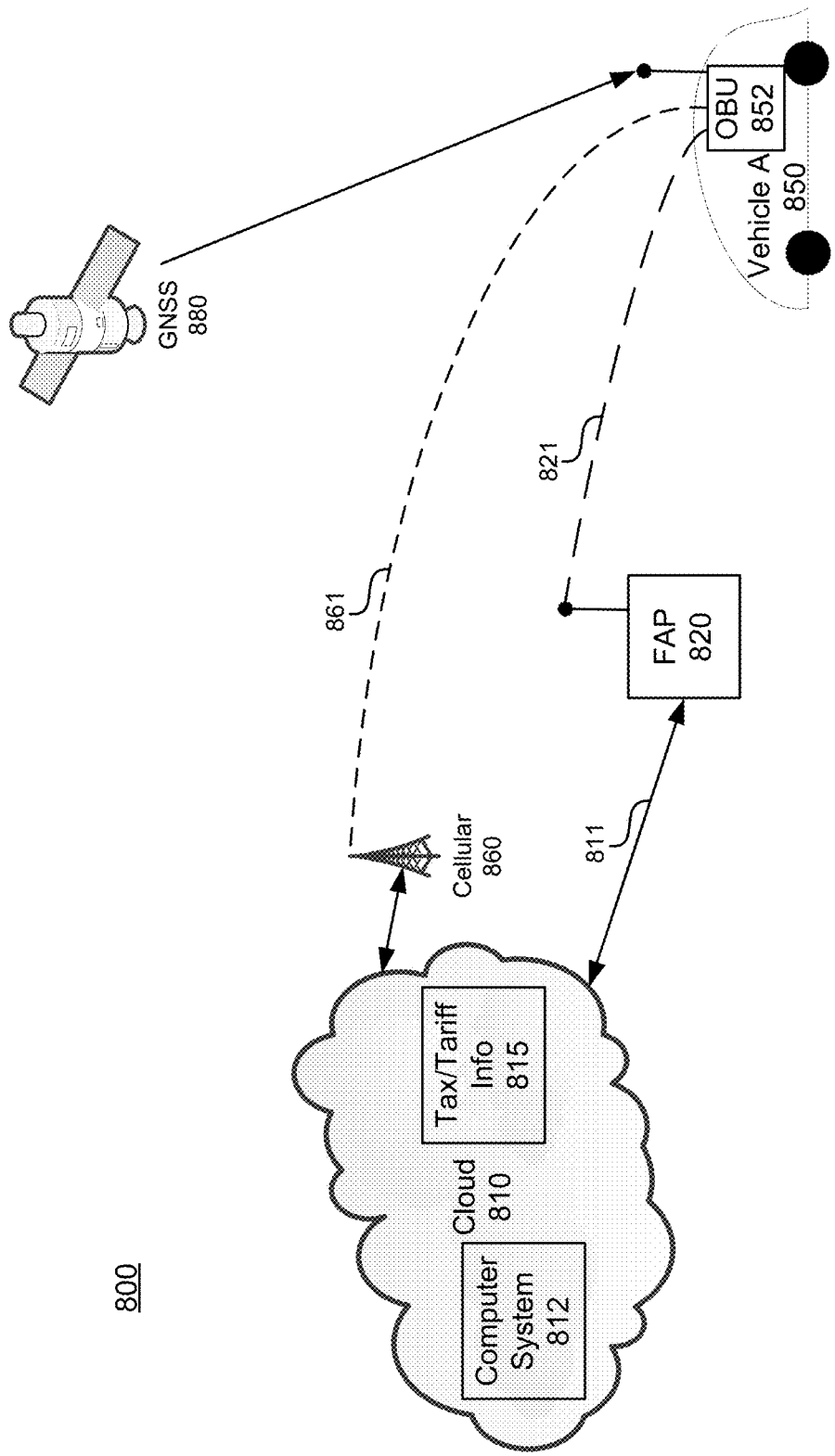
FIG. 8 shows a block diagram illustrating an example network, in accordance with various aspects of the present disclosure.

FIG. 8 shows a block diagram illustrating an example network 800, in accordance with various aspects of the present disclosure. The example of FIG. 8 shows a cloud 810 with a computer system 812, a fixed access point (FAP) 820, and a vehicle A 850 with OBU 852 that may correspond to one of the OBUs 730, 745 of FIG. 7 or other OBUs discussed herein. Cloud 810 also includes taxation and tariff information 815 that may be applicable to the geographic area served by the network 800. As shown in FIG. 8, the FAP 820 is communicatively coupled via the cloud 810 to computer system 812 and taxation and tariff information 815 using a wired or wireless link as described herein above. The OBU 852 of the vehicle A 850 may communicatively couple to the FAP 820 via wireless communication link 821 using, for example, Wi-Fi or DSRC, or may communicatively couple to the computer system 812 and taxation and tariff information 815 via cloud 810 using a cellular communication link 861 and cellular infrastructure 860. The OBU 852 of vehicle A 850 may, for example, determine its current geographic location (e.g., geographic coordinate information including latitude and longitude) using a GNSS receiver (not shown) of the OBU 852 to receive signals from a constellation of satellites of a GNSS 880. Additional approaches for determining a physical location may be used including, for example, those described in U.S. patent application Ser. No. 15/647,234, titled "Systems and Methods for Vehicular Positioning Based on Wireless Fingerprinting Data in a Network of Moving Things Including, for Example, Autonomous Vehicles," filed Jul. 11, 2017; in U.S. patent application Ser. No. 15/244,394, titled "Using Anchors to Correct GPS Data in a Network of Moving Things," filed Aug. 23, 2016; and in U.S. patent application Ser. No. 15/596,380, titled "Systems and Methods for Vehicular Positioning Based on the Round-Trip Time of DSRC Messages in a Network of Moving Things," filed May 16, 2017, the complete subject matter of each of which is hereby incorporated herein, in its respective entirety, for all purposes.

In the example of FIG. 8, taxation and/or tariff information 815 may be stored and updated by cloud-based computer system 812, and nodes of the network (e.g., OBU 852 in vehicle A 850) may access updates to taxation and tariff information 815 via a wireless communication link such as, for example, a Wi-Fi LAN supported by the fixed access point (FAP) 820 when in wireless communication range, or via cellular communication network 860 if not within wireless communication range of the FAP 820. Updating such tariff and taxation information may, for example, employ aspects of U.S. patent application Ser. No. 15/138,370, titled "Systems and Methods for Remote Configuration Update and Distribution in a Network of Moving Things," filed on Apr. 26, 2016, the complete subject matter of which is hereby incorporated herein by reference in its entirety, for all purposes. Although only one fixed access point and only one vehicle are shown in FIG. 8, a network according to the present disclosure may comprise a greater number of access points and vehicles, as discussed above, without departing from the spirit and scope of the present disclosure.

Figure 9:
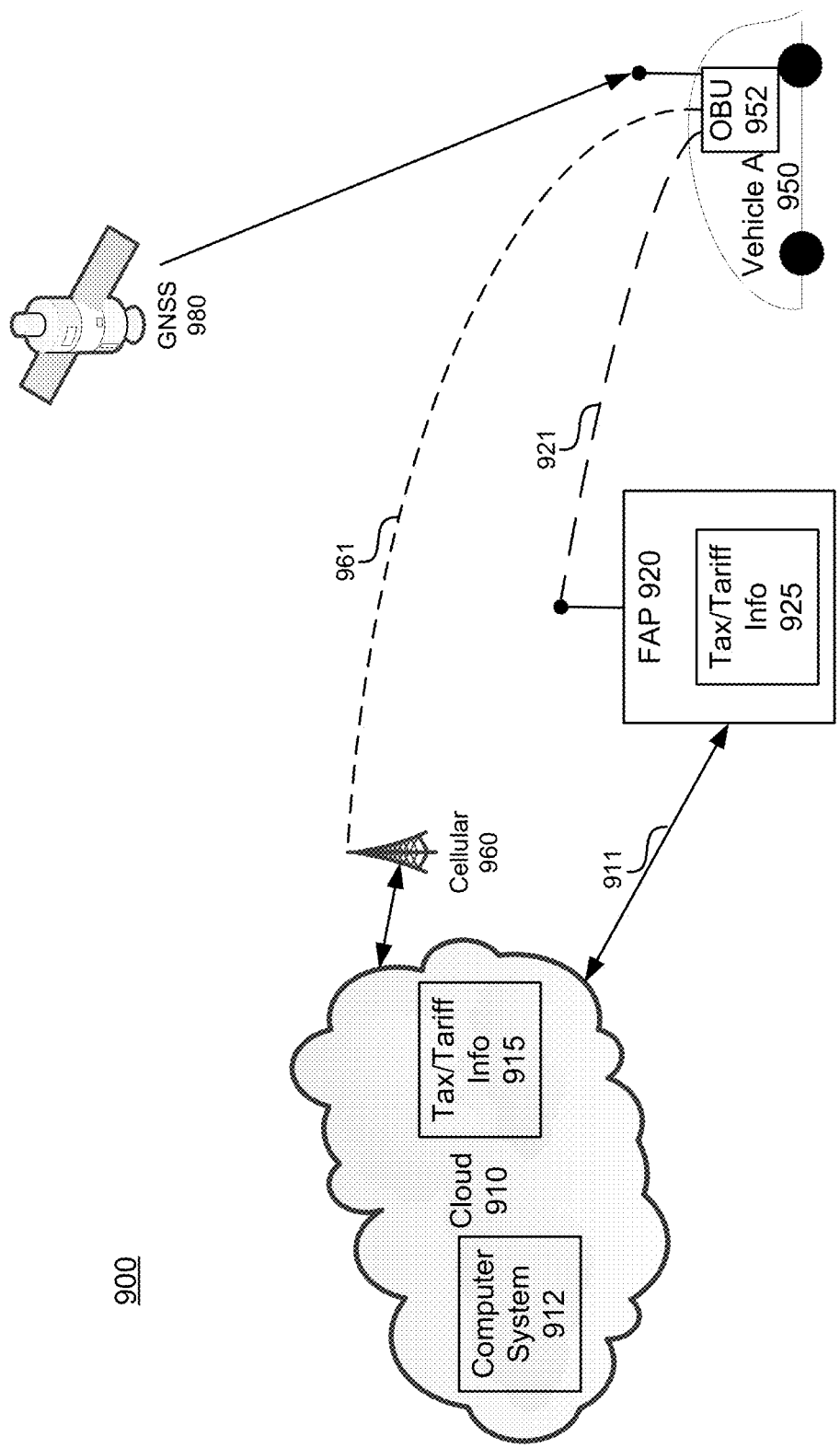
FIG. 9 shows a block diagram illustrating another example network, in accordance with various aspects of the present disclosure.

FIG. 9 shows a block diagram illustrating another example network 900, in accordance with various aspects of the present disclosure. FIG. 9 is similar in many ways to the illustration of FIG. 8, and objects having same or similar names may represent a same or similar type of object. For example, the cloud 910, computer system 912, FAP 920, vehicle A 950, and OBU 952 may correspond to the cloud 810, computer system 812, FAP 820, vehicle A 850, and OBU 852 of FIG. 8, respectively. Cloud 910 also includes taxation and tariff information 915 applicable to the geographic area served by the network 900. The FAP 920 may be communicatively coupled via the cloud 910 to computer system 912 and taxation and tariff information 915, using a wired or wireless link as described herein above. The OBU 952 of the vehicle A 950 may communicatively couple to the FAP 920 via wireless communication link 921 using, for example, Wi-Fi, DSRC, or other suitable wireless communication technology having a relatively shorter range of wireless communication, or may communicatively couple to the computer system 912 and taxation and tariff information 915 via cloud 910 using a cellular communication link 961 and cellular infrastructure 960 that supports a relatively longer range of wireless communication. The OBU 952 of vehicle A 950 may also determine its current geographic location (e.g., geographic coordinate information, including latitude and longitude) using a GNSS receiver (not shown) of the OBU 952 to receive signals from a constellation of satellites of a GNSS 980.

In the illustration of FIG. 9, taxation and/or tariff information may be stored at the cloud 910 as taxation and tariff information 915 and updated as described above. In the illustration of FIG. 9, however, some or all of such taxation and tariff information may also be available at the FAP 920 as taxation and tariff information 925, to assure that needed information is easily and quickly accessible by other network nodes, without directly accessing the taxation and tariff information 915 at the cloud 910. In accordance with the example of FIG. 9, the OBU of vehicles (e.g., the OBU 952 of vehicle A 950) may access updated taxation and tariff information 925 from the FAP 920 via a wireless communication link (e.g., Wi-Fi LAN or DSRC) when within wireless range of FAP 920, or may access taxation and tariff information 915 via a cellular communication link 961 and cellular infrastructure 960, when not within wireless communication range of a fixed access point (e.g., FAP 920). For example, the FAP 920 may cache that taxation and tariff information from the taxation and tariff information 915 of the cloud 910 that applies particularly to network operation in a geographic region within a certain distance surrounding the FAP 920, or within a geometric boundary (e.g., a geo-fence) within which the FAP 920 is located.

Figure 10:
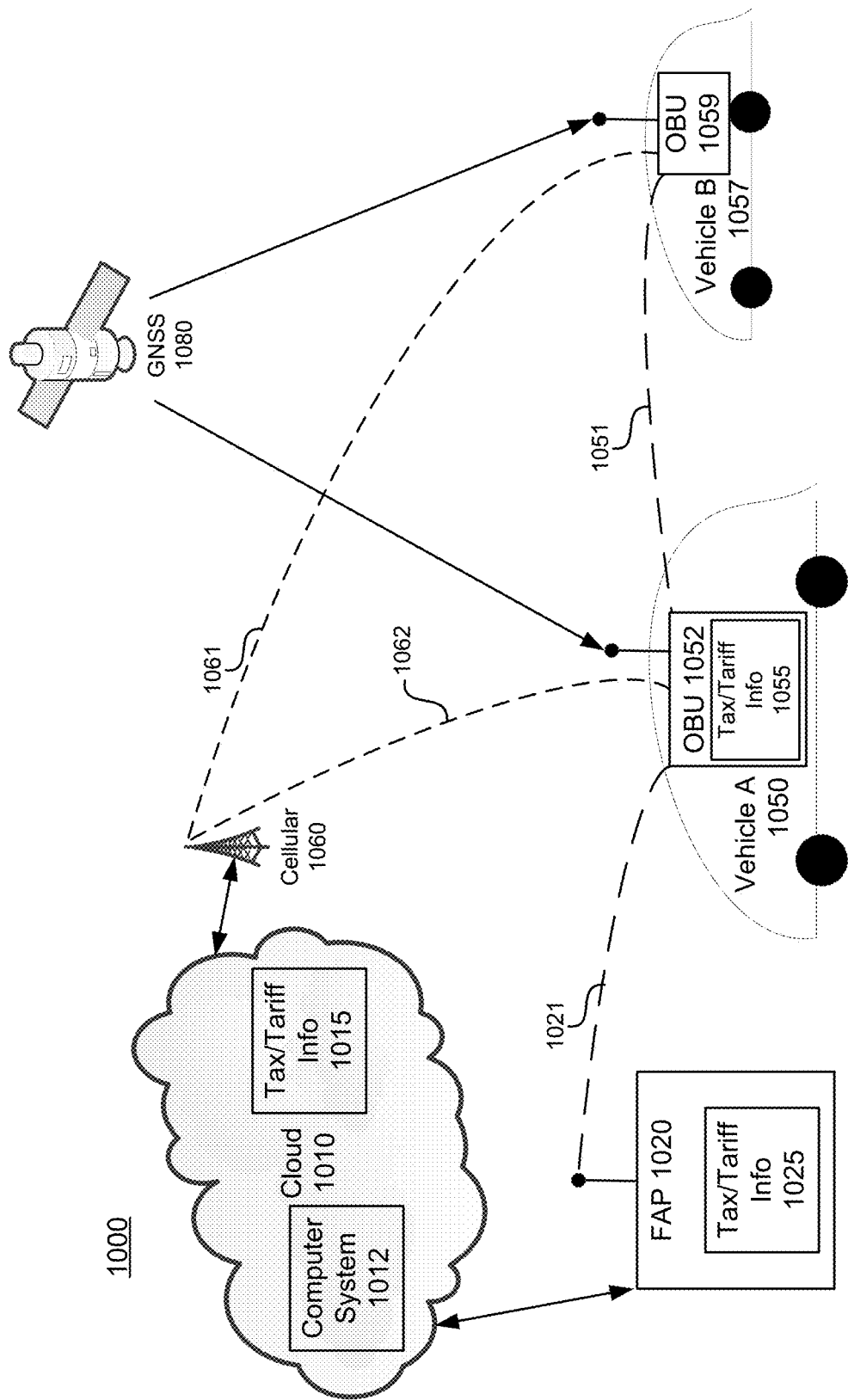
FIG. 10 illustrates a block diagram that shows yet another example network, in accordance with various aspects of the present disclosure.

FIG. 10 illustrates a block diagram that shows yet another example network 1000, in accordance with various aspects of the present disclosure. FIG. 10 is also similar in many ways to the illustrations of FIG. 8 and FIG. 9, and objects having same or similar names may represent a same or similar type of object. For example, the cloud 1010; computer system 1012; vehicles A 1050 or B 1057; and OBUs 1052, 1059 of FIG. 10 may correspond to the cloud 810, computer system 812, FAP 820, vehicle A 850, and OBU 852 of FIG. 8, respectively. In a manner similar to that of FIGS. 8 and 9, the cloud 1010 may also include taxation and tariff information 1015 that may be applicable to the geographic area served by the network 1000. The FAP 1020 of FIG. 10 may be communicatively coupled via the cloud 1010 to computer system 1012 and taxation and tariff information 1015, using a wired or wireless link, as described herein above. The OBUs 1052, 1059 of respective vehicles A 1050 and B 1057 may communicatively couple to the FAP 1020 via a wireless communication link (e.g., for OBU 1052 of vehicle A 1050, communication link 1021) using, for example, Wi-Fi or DSRC, when within wireless communication range, and/or may communicatively couple to the computer system 1012 and taxation and tariff information 1015 via cloud 1010 using cellular communication links 1061, 1062 and cellular infrastructure 1060, when not within wireless communication range of a FAP. The OBUs 1052, 1059 of vehicles A 1050 and B 1057 may also determine their respective current geographic locations (e.g., geographic coordinate information including latitude and longitude) using respective GNSS receivers (not shown) of the OBUs 1052, 1059 to receive signals from a constellation of satellites of a GNSS 1080.

In the illustration of FIG. 10, taxation and/or tariff information may be stored at the cloud 1010 as taxation and tariff information 1015, and may be updated as described above. In the illustration of FIG. 10, as in FIG. 9, such taxation and/or tariff information may also be available at the FAP 1020 as taxation and tariff information 1025 that may, for example, correspond to the taxation and tariff information 925 located at FAP 920 of FIG. 9, to assure that such information is easily and quickly accessible by other network nodes within wireless communication range of FAP 1020, without a need to directly access the taxation and tariff information 1015 at the cloud 1010. In accordance with the example of FIG. 10, the OBUs of vehicles A, B (e.g., the OBUs 1052, 1059 of vehicles A 1050 and B 1057, respectively) may access updated taxation and tariff information 1025 from the FAP 1020 via respective wireless communication links (e.g., Wi-Fi LAN or DSRC), when within wireless range of FAP 1020, or may access taxation and tariff information 1015 via cellular communication links 1061, 1062 and cellular infrastructure 1060, when not within wireless communication range of a fixed access point (e.g., FAP 1020). In addition, as shown in the example of FIG. 10, some or all of such taxation and tariff information may be maintained by an OBU (e.g., OBUs 1052, 1059), such as the taxation and tariff information 1055 stored at OBU 1052 of vehicle A 1050. Such stored taxation and tariff information may be accessed by other OBUs such as, for example, the OBU 1059 of vehicle B 1057 of FIG. 10. The nodes of a network as described herein such as, for example, the OBU 1052 or OBU 1059, or other nodes serving particular portions of the network 1000 (e.g., regions or areas within a certain physical distance from the OBUs or other nodes) may cache taxation and tariff information that applies to network usage within, to, and/or from the particular portion(s) served by the OBUs or other nodes. In accordance with various aspects of the present disclosure, the collection of taxation and tariff information maintained at the OBUs or other nodes may be dynamically updated, as a node moves about the network. It should be noted that, in accordance with various aspects of the present disclosure, intermediate nodes (e.g., OBUs/MAPs, NCs/MCs, FAPs/RSUs) that are part of a communication path between a user of a network or cloud-based service and the entity providing the network/cloud-based service being accessed by the user, may dynamically update their individual storage of taxation and tariff information (e.g., such as taxation and tariff information 1025 of the FAP 1020 and the taxation and tariff information 1055 of OBU 1052). Such updating may, for example, be based upon the presence of each of the intermediate node(s) within a geographic boundary (e.g., geofence), at a particular geographic/physical location (e.g., latitude/longitude), and/or the geographic/physical location of the endpoints (e.g., the user, and the location of the network node of the entity providing the network) of the communication link between the user of network services and the entity providing the network/cloud-based service being accessed by the user. It should also be noted that information that specifically identifies the node(s) of a communication path through a network as described herein, that identifies the respective geographic/physical location (e.g., latitude/longitude) of the node(s), that identifies the type(s) of the node(s) (e.g., OBU, MAP, RSU, FAP, NC/MC, etc.), that identifies the type of communication connection (e.g., real-time, delay-tolerant, etc.), that identifies the time of day, and/or other parameters, may be monitored, recorded, and stored for the various portions (i.e., communication path segments) to support the metering, accounting, and billing functions as part of managing operation of the network.

Figure 11:
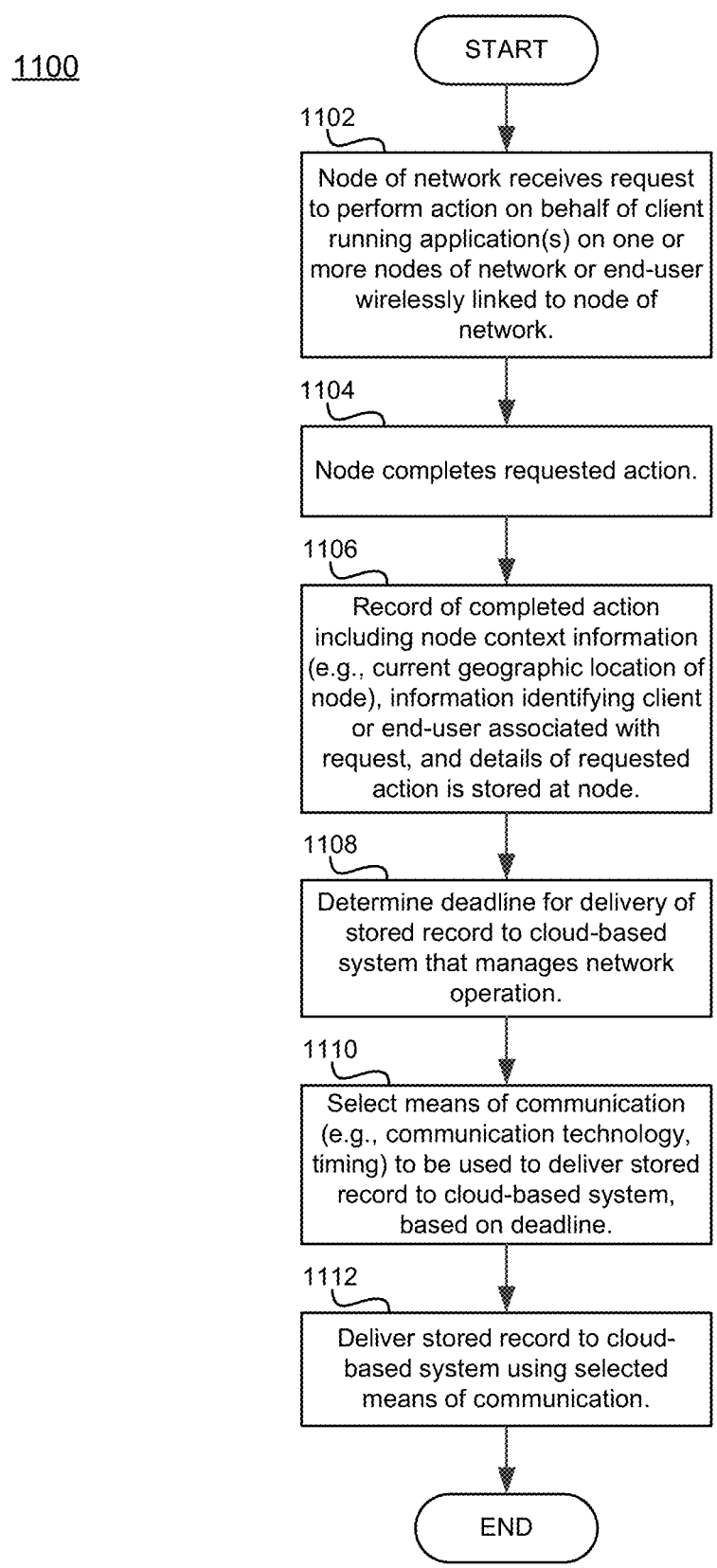
FIG. 11 illustrates a flowchart for an example method of managing operation of nodes of a network of moving things, in accordance with various aspects of the present disclosure.

FIG. 11 illustrates a flowchart 1100 for an example method of managing operation of nodes of a network of moving things, in accordance with various aspects of the present disclosure. The example actions shown in FIG. 11 and described below may involve various elements of networks shown in and discussed above with regard to FIGS. 1-10. The method of FIG. 11 begins at block 1102.

At block 1102, a node of a network of moving things according to aspects of the present disclosure (e.g., FAP 820, OBU 852, NC/MC, etc.) may receive a request to perform an action on behalf of a client running one or more application(s) on one or more nodes of a network as described herein, or on behalf of an end-user device (e.g., smartphone, laptop computer, tablet computer, etc.) wirelessly linked to a node (e.g., OBU 852) of such a network. For example, a software application running on a node of the network (e.g., an OBU/MAP or RSU/FAP) on behalf of a customer of the owner/operator of the network may request a communication link for the transfer of data from the node, an end-user device (e.g., a smartphone, laptop computer, etc.) may request a communication link connecting the end-user device to the Internet, or a node may request storage for offload of data. Although only three examples are mentioned here, actions with respect to many other network/node services and/or resources may be requested, without departing from the spirit or scope of the present disclosure. In response, the node may then, at block 1104, complete the requested action.

Next, at block 1106, the node may generate a record or log entry for the completed action including, by way of example and not limitation, one or more items of node context information (e.g., current geographic location/physical location/geo-fence location of node; information identifying the requesting node; information identifying the requested service/action, information identifying the requesting software application; and/or other context information for the node as described above), information identifying a client or end-user that is associated with requested action, and details of the requested action, as described above. The record/log entry is then stored at the node.

Then, at block 1108, the node may determine a deadline for delivery of the stored record/log entry to, for example, a designated computer system (e.g., a cloud-based computer system 812, 912, 1012) that manages aspects of operation of a network such as described herein. For example, depending upon the nature of the request (e.g., the action requested, the node making the request, and/or various items of context information for the node), such a deadline may be an interval of time (e.g., within X seconds, minutes, hours) following receipt of the request, or an absolute date/time (e.g., by midnight, by the first day of the next month, etc.) by which the stored record/log entry and any other currently stored or to be stored entries is/are to be delivered to a particular system of the network of moving things.

Next, at block 1110, the node may select a means and/or type of communication (e.g., communication technology, timing) to be used to deliver the stored record(s)/log entry(ies) to the designated destination (e.g., other node, cloud-based computer system/server), based upon the deadline for delivery of the stored record(s)/log entry(ies). For example, the node performing the method may or may not currently be within wireless communication range of a fixed access point (e.g., FAPs 820, 920, 1020), and may or may not be within wireless communication range of an OBU (e.g., OBUs 852, 952, 1052, 1059) that is within, or has a communication path to a fixed access point. In accordance with aspects of the present disclosure, if the deadline permits, the node may choose to hold such record(s)/log entry(ies) until the node is within wireless communication range of such network nodes. However, if the deadline is imminent, and the node determines that no further delay in delivery is acceptable, the node may choose to select use of a communication technology such as, for example, a cellular network, to enable the node to deliver the stored record(s)/log entry(ies) to the designated computer system within the specified deadline, albeit at possibly greater cost than other communication technologies (e.g., DSRC, Wi-Fi).

Next, at block 1112, the node performing the method may deliver the stored record(s)/log entry(ies) to the designated computer system (e.g., another node, a cloud-based system) using selected means or type of communication (e.g., Wi-Fi LAN, DSRC, cellular, real-time, delay-tolerant, etc.). Once delivered to the designated computer system or node, the record(s)/log entry(ies) may be used, along with applicable taxation and tariff information (e.g., taxation and tariff information 815, 915, 1015), and other parameters/information such as, for example, geographic location/physical location/geo-fence (i.e., "fence") information or other information discussed above, to perform metering, accounting, and billing functions as part of managing operation of the network. It should be noted that such metering, accounting, and/or billing functions may take into account details of each node of a path through the network between the user and the designated computer system or network node involved in performing the action requested for the user. It should be noted that the steps of the example method of FIG. 11 may be combined, split, re-ordered, augmented, or omitted without departing from the spirit or scope of the present disclosure.

A network system in accordance with various aspects of the present disclosure supports metering, accounting, and billing for the usage of various resources of a mobile network infrastructure. Such a network system allows owners/operators of a network infrastructure to pay for their investment by charging different entities for the usage of the elements and/or resources of a network infrastructure. Aspects of the present disclosure enable an owner and/or operator of a network infrastructure to track, account, and bill for use of multiple layers of services of the network.

A network system in accordance with aspects of the present disclosure enables an owner or operator of a network to understand what to charge and who to charge for use of the resource and services of a network infrastructure. For example, a system in accordance with the present disclosure supports billing of a vehicle owner and/or OBU owner for the use of sensor data traffic generated by network nodes/elements in order to enable the operation of an autonomous vehicle, or billing of the operator of a vehicle for data traffic generated due to the use of in-vehicle entertainment systems/applications. A system in accordance with aspects of the present disclosure also supports metering, accounting, and billing of infrastructure owners for use of services provided by other network infrastructure/resources/systems that are not theirs. A system in accordance with aspects of the present disclosure enables billing of external entities such as, for example, advertisers, for the use of network infrastructure elements (e.g., display screens, communication links, storage, computing power, etc.) used in delivering their product to targeted audiences. A system in accordance with various aspects of the present disclosure enables a network infrastructure owner or operator to know, for example, that a specific vehicle communicated a specific amount of data, consumed by a certain user, using a specific type of communication link, for a certain amount of time, at a specific geographic/physical/geo-fence location, while accessing a specific service that may be running in the cloud or only within the local network elements (e.g., one or more nodes).

A system in accordance with various aspects of the present disclosure supports the safe and secure updating by regulatory entities of taxation and tariff information for network infrastructure usage. A system according to the present disclosure enables regulatory entities responsible for data traffic control: to shape network data traffic based on taxation policies (e.g., according to signal conditions, limiting end-user data traffic according to geographic area/region/physical location, and/or when network congestion and scarcity is an issue. In addition, a system according to the present disclosure enables taxation and tariffs based on geographic/physical/geo-fence location information for the various segments/links of a communication path, including dynamic update and adjustment of taxation and/or tariffs based on, for example, socio-economic problems, where taxes and/or tariffs in certain areas may be adjusted to permit fair access to network services and user mobility.

Various aspects of the present disclosure may be seen in a method of operating a node of a wireless network comprising a plurality of nodes configured to communicate with one another. Such a method may comprise receiving, by a first node at a first physical location, a request to perform a specified action according to a set of requirements supported by the first node using resources of the first node or resources of the wireless network; and performing the specified action, by the first node during a first time period, in response to the request. The method may also comprise placing in storage, at the first node, a record of performance of the specified action, the record of performance comprising information identifying a source of the request, information identifying the first node, information identifying the specified action, information identifying the first time period, information identifying an amount of each resource used, and information identifying the first physical location. The method may further comprise determining, by the first node, a deadline for delivery of the record of performance to a remote system that manages operation of the wireless network; and selecting, by the first node from a plurality of types of communication connections supported by the first node, a type of communication connection to be used for delivery of the record of performance to the remote system, based on the record of performance and the deadline for delivery. In addition, the method may comprise delivering the record of performance to the remote system by the first node using the type of communication connection selected by the first node.

In accordance with various aspects of the present disclosure, the plurality of types of communication connections may comprise a relatively lower latency communication connection established on demand using a wide area wireless network and a relatively higher latency communication connection using an interconnected group of nodes of the plurality of nodes. The relatively lower latency communication connection may comprise a commercial cellular network. The specified action may comprise transmission of a data sample acquired from a sensor operably coupled to the first node, and the specified action may comprise establishing a communication link between a wireless communication device of an end-user and an information resource on the Internet. The first node may be attached to a vehicle, and the specified action may comprise storing at the first node, data acquired by the first node while traveling about a service area of the wireless network; physically transporting the stored data to a fixed second physical location of a second node of the plurality of nodes; and wirelessly offloading the stored data from the first node to the second node at the second physical location. The remote system may process the record of performance to produce one or both of information for billing an issuer of the request and information for use in conforming with requirements of a government entity that regulates a service area of the wireless network.

Additional aspects of the present disclosure may be found in a non-transitory computer-readable medium on which is stored a plurality of code sections, where each code section comprises a plurality of instructions executable by one or more processors. The plurality of instructions may cause the one or more processors to perform the actions of a method of operating a node of a wireless network comprising a plurality of nodes configured to communicate with one another, such as the actions of the method described above.

Further aspects of the present disclosure may be observed in a system for a node of a wireless network comprising a plurality of nodes configured to communicate with one another. Such a system may comprise in a first node of the plurality of network devices, one or more processors operably coupled to at least one wireless communication interface configurable to communicate with other nodes of the plurality of nodes of the wireless network, and the one or more processors may be operable to, at least, perform the actions of a method, such as the method described above.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a node of a wireless network comprising a plurality of nodes configured to communicate with one another, the method comprising:
receiving, by a first node at a first physical location, a request to perform a specified action according to a set of requirements supported by the first node, using resources of the first node or resources of the wireless network for performing the specified action;
performing the specified action, by the first node during a first time period, in response to the request;
placing in storage, at the first node, a record of performance of the specified action, the record of performance comprising information identifying a source of the request, information identifying the first node, information identifying the specified action, information identifying the first time period, information identifying an amount of each resource used for performing the specified action, wherein the each resource is one of the resources of the first node or one of the resources of the wireless network, and information identifying the first physical location;
determining, by the first node, a deadline for delivery of the record of performance to a remote system that manages operation of the wireless network;
selecting, by the first node from a plurality of types of communication connections supported by the first node, a type of communication connection to be used for delivery of the record of performance to the remote system, based on the record of performance and the deadline for delivery; and
delivering the record of performance to the remote system by the first node using the type of communication connection selected by the first node.

2. The method according to claim 1, wherein the plurality of types of communication connections comprises a relatively lower latency communication connection established on demand using a wide area wireless network and a relatively higher latency communication connection using an interconnected group of nodes of the plurality of nodes.

3. The method according to claim 2, wherein the relatively lower latency communication connection comprises a commercial cellular network.

4. The method according to claim 1, wherein the specified action comprises transmission of a data sample acquired from a sensor operably coupled to the first node.

5. The method according to claim 1, wherein the specified action comprises establishing a communication link between a wireless communication device of an end-user and an information resource on the Internet.

6. The method according to claim 1, wherein the first node is attached to a vehicle and wherein the specified action comprises:
storing at the first node, a data sample acquired by the first node while traveling about a service area of the wireless network;
physically transporting the stored data to a fixed second physical location of a fixed node of the plurality of nodes; and
wirelessly offloading the stored data from the first node to the fixed node at the second physical location.

7. The method according to claim 1, wherein the remote system processes the record of performance to produce one or both of information for billing an issuer of the request and information for use in conforming with requirements of a government entity that regulates a service area of the wireless network.

8. A non-transitory computer-readable medium on which is stored a plurality of code sections, wherein each code section comprises a plurality of instructions executable by one or more processors to cause the one or more processors to perform the actions of a method of operating a node of a wireless network comprising a plurality of nodes configured to communicate with one another, the actions of the method comprising:
receiving, by a first node at a first physical location, a request to perform a specified action according to a set of requirements supported by the first node using resources of the first node or resources of the wireless network for performing the specified action;
performing the specified action, by the first node during a first time period, in response to the request;
placing in storage, at the first node, a record of performance of the specified action, the record of performance comprising information identifying a source of the request, information identifying the first node, information identifying the specified action, information identifying the first time period, information identifying an amount of each resource used for performing the specified action, wherein the each resource is one of the resources of the first node or one of the resources of the wireless network, and information identifying the first physical location;
determining, by the first node, a deadline for delivery of the record of performance to a remote system that manages operation of the wireless network;
selecting, by the first node from a plurality of types of communication connections supported by the first node, a type of communication connection to be used for delivery of the record of performance to the remote system, based on the record of performance and the deadline for delivery; and
delivering the record of performance to the remote system by the first node using the type of communication connection selected by the first node.

9. The non-transitory computer-readable medium according to claim 8, wherein the plurality of types of communication connections comprises a relatively lower latency communication connection established on demand using a wide area wireless network and a relatively higher latency communication connection using an interconnected group of nodes of the plurality of nodes.

10. The non-transitory computer-readable medium according to claim 9, wherein the relatively lower latency communication connection comprises a commercial cellular network.

11. The non-transitory computer-readable medium according to claim 8, wherein the specified action comprises transmission of a data sample acquired from a sensor operably coupled to the first node.

12. The non-transitory computer-readable medium according to claim 8, wherein the specified action comprises establishing a communication link between a wireless communication device of an end-user and an information resource on the Internet.

13. The non-transitory computer-readable medium according to claim 8, wherein the first node is attached to a vehicle and wherein the specified action comprises:
- storing at the first node, a data sample acquired by the first node while traveling about a service area of the wireless network;
- physically transporting the stored data to a fixed second physical location of a fixed node of the plurality of nodes; and
- wirelessly offloading the stored data from the first node to the fixed node at the second physical location.

14. The non-transitory computer-readable medium according to claim 8, wherein the remote system processes the record of performance to produce one or both of information for billing an issuer of the request and information for use in conforming with requirements of a government entity that regulates a service area of the wireless network.

15. A system for a node of a wireless network comprising a plurality of nodes configured to communicate with one another, the system comprising:
- in a first node of the plurality of nodes, one or more processors operably coupled to at least one wireless communication interface configurable to communicate with other nodes of the plurality of nodes of the wireless network, the one or more processors operable to, at least:
  - receive, by the first node at a first physical location, a request to perform a specified action according to a set of requirements supported by the first node using resources of the first node or resources of the wireless network for performing the specified action;
  - perform the specified action, by the first node during a first time period, in response to the request;
  - place in storage, at the first node, a record of performance of the specified action, the record of performance comprising information identifying a source of the request, information identifying the first node, information identifying the specified action, information identifying the first time period, information identifying an amount of each resource used for performing the specified action, wherein the each resource is one of the resources of the first node or one of the resources of the wireless network, and information identifying the first physical location;
  - determine, by the first node, a deadline for delivery of the record of performance to a remote system that manages operation of the wireless network;
  - select, by the first node from a plurality of types of communication connections supported by the first node, a type of communication connection to be used for delivery of the record of performance to the remote system, based on the record of performance and the deadline for delivery; and
  - deliver the record of performance to the remote system by the first node using the type of communication connection selected by the first node.

16. The system according to claim 15, wherein the plurality of types of communication connections comprises a relatively lower latency communication connection established on demand using a wide area wireless network and a relatively higher latency communication connection using an interconnected group of nodes of the plurality of nodes.

17. The system according to claim 16, wherein the relatively lower latency communication connection comprises a commercial cellular network.

18. The system according to claim 15, wherein the specified action comprises transmission of a data sample acquired from a sensor operably coupled to the first node.

19. The system according to claim 15, wherein the specified action comprises establishing a communication link between a wireless communication device of an end-user and an information resource on the Internet.

20. The system according to claim 15, wherein the first node is attached to a vehicle and wherein the specified action comprises:
- storing at the first node, a data sample acquired by the first node while traveling about a service area of the wireless network;
- physically transporting the stored data to a fixed second physical location of a fixed node of the plurality of nodes; and
- wirelessly offloading the stored data from the first node to the fixed node at the second physical location.

21. The system according to claim 15, wherein the remote system processes the record of performance to produce one or both of information for billing an issuer of the request and information for use in conforming with requirements of a government entity that regulates a service area of the wireless network.

* * * * *